United States Patent [19]

Nishikawa et al.

[11] Patent Number: 4,691,596
[45] Date of Patent: Sep. 8, 1987

[54] AUTOMATIC TRANSMISSION WITH ANTI CREEP DEVICE

[75] Inventors: Masao Nishikawa; Yoshimi Sakurai, both of Tokyo, Japan

[73] Assignee: Honda Giken Kogyo Kabushiki Kaisha, Tokyo, Japan

[21] Appl. No.: 650,358

[22] Filed: Sep. 13, 1984

[30] Foreign Application Priority Data

Sep. 20, 1983 [JP] Japan ................................. 58-173610
Sep. 20, 1983 [JP] Japan ................................. 58-173611

[51] Int. Cl.$^4$ ............................................. B60K 41/16
[52] U.S. Cl. ..................................... 74/869; 74/867; 74/868
[58] Field of Search ................. 74/869, 867, 868, 878, 74/866, 877

[56] References Cited

U.S. PATENT DOCUMENTS

| | | | |
|---|---|---|---|
| 3,890,856 | 6/1975 | Miyauchi et al. | 74/868 X |
| 4,313,353 | 2/1982 | Honig | 74/867 X |
| 4,476,745 | 10/1984 | Moan | 74/869 X |
| 4,478,108 | 10/1984 | Nishimura et al. | 74/878 X |
| 4,501,173 | 2/1985 | Honig | 74/869 X |
| 4,513,638 | 4/1985 | Nishikawa et al. | 74/866 |
| 4,513,639 | 4/1985 | Hiramatsu | 74/866 |
| 4,526,065 | 7/1985 | Rosen et al. | 74/867 X |

FOREIGN PATENT DOCUMENTS

| | | | |
|---|---|---|---|
| 3019274 | 11/1981 | Fed. Rep. of Germany | 74/866 |
| 3022364 | 12/1981 | Fed. Rep. of Germany | 74/877 |
| 0063046 | 5/1980 | Japan | 74/866 |
| 0149453 | 11/1980 | Japan | 74/869 |

Primary Examiner—Leslie Braun
Assistant Examiner—David Novais
Attorney, Agent, or Firm—Lyon & Lyon

[57] ABSTRACT

An automatic transmission includes a mechanical transmission mechanism coupled to a fluid coupling such as a torque converter. The mechanical transmission mechanism has several power trains and several friction engagement mechanisms. By selective supply of actuating fluid pressure to selective ones of the friction engagement mechanisms, various speed stages are provided. A control system for this transmission includes an assembly for producing a signal representative of engine output, an anti creep device for varying the actuating hydraulic fluid pressure for a one of the friction engagement mechanisms which is engaged for providing the lowest speed stage, according to the signal representative of engine output, from a low value when engine output is low upward as engine output increases, and can include an assembly for inhibiting the action of the anti creep device so as to cause that actuating hydraulic fluid pressure for that one of the friction engagement mechanisms to be at its high value when the mechanical transmission mechanism is providing one of its speed stages higher than the lowest speed stage. Also, the control system can include a manually controllable assembly for, when so desired, inhibiting the action of the anti creep device so as to cause the actuating hydraulic fluid pressure for that one of the friction engagement mechanisms to be at its unaltered value.

4 Claims, 5 Drawing Figures

THROTTLE PRESSURE
(ACCELERATOR PEDAL DEPRESSION)

AUTOMATIC TRANSMISSION WITH ANTI CREEP DEVICE

BACKGROUND OF THE INVENTION

The present invention relates to an anti creep device for an automatic transmission for a vehicle, and more particularly relates to such an anti creep device which can prevent anti creep action when the transmission is shifted to a higher speed stage than the first speed stage, and also to such an anti creep device which can be manually controlled to prevent or to provide creep, according to the will of the vehicle operator.

A vehicle equipped with an automatic transmission has a tendency, when stationary with the engine running in the idling condition and with its manual range selection means such as a range shifting lever set to a forward drive position such as drive range, to move forward against the intention of the vehicle operator, due to the dragging torque of the fluid coupling such as a torque converter; this is called creep. This creep phenomenon is in general undesirable, since it is outside the control of the vehicle operator and typically requires him or her to keep the brake pedal of the vehicle depressed in order to prevent vehicle motion. Also, when the vehicle is not moving, such creep applies a braking force on the engine of the vehicle, and thus necessitates so called idle up to be performed, in which the throttle valve of the engine is somewhat opened as compared to its setting when the transmission is in neutral range, in order to compensate for this braking action. This deteriorates the fuel economy of the vehicle, and also complicates the control structures therefor.

Accordingly, it has been recognized that, when the vehicle is stationary with the engine running in the idling condition and the transmission set to the drive range, it is desirable to cut off the power transfer between the engine and the drive wheels of the vehicle completely by setting the transmission to a neutral state, so as to be able to permanently keep the throttle valve set to a low setting, and so as to prevent any undesired forward motion of the vehicle; and in the past various anti creep devices have been proposed to this end. A typical such prior art device is one in which the stationary state of the vehicle is detected and the actuating pressure of a friction engagement device (such as a clutch) which provides the first speed stage is kept below its engagement pressure, so as not to engage the first speed stage at all in these conditions. Then, when the vehicle is to be moved away from rest, the operator presses down on the accelerator pedal thereof, and it is arranged that the actuating pressure of the friction engagement device is controlled in proportion to the mount of depression of said accelerator pedal. According to such a system, the vehicle speed is used as an auxiliary parameter for detecting when the vehicle is at rest. Now, this does not create any problem when the anti creep device is electrically controlled, but when the system is based upon a hydraulic system, in order to improve the comfort feeling of starting the vehicle off from rest, it is necessary to detect the vehicle speed either electrically or hydraulically. In the former case, the cost becomes high; and in the latter case it becomes necessary to introduce a hydraulic pressure type vehicle speed detector for this purpose only into an automatic transmission.

It is conceivable to use the governor valve as a vehicle speed detector, but, since a governor valve generally outputs a hydrualic fluid pressure which gradually increases from zero vehicle speed, a snap action mechanism with some hysteresis similar to those used in shift valves bcomes necessary, and again the problem arises that the cost becomes high.

Also, as a matter of course, normally anti creep is provided when the transmission is engaged to its first speed stage, and operates basically by disengaging the first speed stage friction engaging means. Now, if this anti creep function is also provided when the vehicle is running with the transmission being engaged to a speed stage higher than this first speed stage, with the first speed stage friction engaging means being disengaged in this condition also, the problem may arise of free wheeling of this first speed stage friction engaging means (depending however upon the exact particular structure of the transmission), and this can cause rubbing between the respective friction engaging members, thus generating heat and possibly damaging the friction engaging means.

Another consideration that has come to be realized is that in some circumstances creep is actually desirable. For example, it may be convenient when starting the vehicle off from rest on a slope, or when parking in a restricted space. Therefore, in these circumstances, it is desirable for the vehicle operator to be able to prevent the operation of the anti creeping device by a simple means. Now, such a means might be conceived of to be an electrical one, in which an electrical switch was available to the vehicle operator for selectively either providing or not providing anti creep action; but such a mixed electrical/hydraulic system could be unreliable, and involves cost. Accordingly it is desirable for such a system to be purely hydraulic.

SUMMARY OF THE INVENTION

Accordingly, it is an object of the present invention to provide an automatic transmission with a control device which has an anti creep device which is prevented from providing anti creep action when the transmission is set to a certain state.

It is a further object of the present invention to provide such an automatic transmissiom with a control device which is prevented from providing anti creep action when the transmission is set to any speed stage higher than the lowest speed stage.

It is a further object of the present invention to provide such an automatic transmission with such a control device, the provision of which does not necessitate the provision of any special vehicle speed detector.

It is a further object of the present invention to provide such an automatic transmission with a control device which has an anti creep device which can be prevented from providing anti creep action manually by the vehicle operator.

It is a further object of the present invention to provide such an automatic transmission with a control device which has an anti creep device which is fully hydraulic in structure and operation.

It is a further object of the present invention to provide such an automatic transmission with a control device which has an anti creep device which is reliable in operation and simple in structure.

It is a yet further object of the present invention to provide such an automatic transmission with a control device which has an anti creep device which can optimize the starting off feeling for the vehicle.

According to a broad concept of the present invention, these and other objects are accomplished by an automatic transmission, comprising: a fluid coupling; a mechanical transmission mechanism coupled to said fluid coupling, comprising a plurality of power trains and a plurality of friction engagement mechanisms, various ones of said power trains being selectively engagable according to selective supply of actuating fluid pressure to selective ones of said friction engagement mechanisms to provide various speed stages including a lowest speed stage; and a transmission control system comprising, a means for producing a signal representative of engine output, an anti creep means for varying the actuating hydraulic fluid pressure for a one of said friction engagement mechanisms which is engaged for providing said lowest speed stage, according to said signal representative of engine ouput, from a low value when engine output is low upward as engine output increases, and a means for inhibiting the action of said anti creep means, so as to cause said actuating hydraulic fluid pressure for said one of said friction engagement mechanisms to be at its high value.

According to a certain aspect of the present invention, these and other objects are accomplished by the means for inhibiting the action of the anti creep means causing the actuating hydraulic fluid pressure for the relevant friction engagement mechanism to be at its high value when the mechanical transmission mechanism is providing one of its speed stages higher than the lowest speed stage.

According to such a structure, the anti creep inhibiting means definitely stops the anti creep means from providing anti creep, when said gear transmission mechanism is providing said higher one of its speed stages.

According to another aspect of the present invention, these and other objects are accomplished by the means for inhibiting the action of the anti creep means causing the actuating hydraulic fluid pressure for the relevant friction engagement mechanism to be at its high value when the inhibiting means is manually so controlled.

According to such a structure, the manually controllable means can be controlled by the vehicle driver so as to either have creep or not to have creep, according as the particular driving conditions warrant. This makes the control of the vehicle very flexible and convenient, and improves the starting off feeling, as well as being convenient for driving on a slope or in a tight parking space.

BRIEF DESCRIPTION OF THE DRAWINGS

The present invention will now be shown and described with reference to the preferred embodiments thereof, and with reference to the illustrative drawings, which are given purely for the purposes of explanation only, and are none of them intended to be limitative of the scope of the present invention. In the description, spatial terms are used in the sense of the relevant figure throughout, except where otherwise stated, and in the drawings.

DESCRIPTION OF THE PREFERRED EMBODIMENTS

Figure 1:
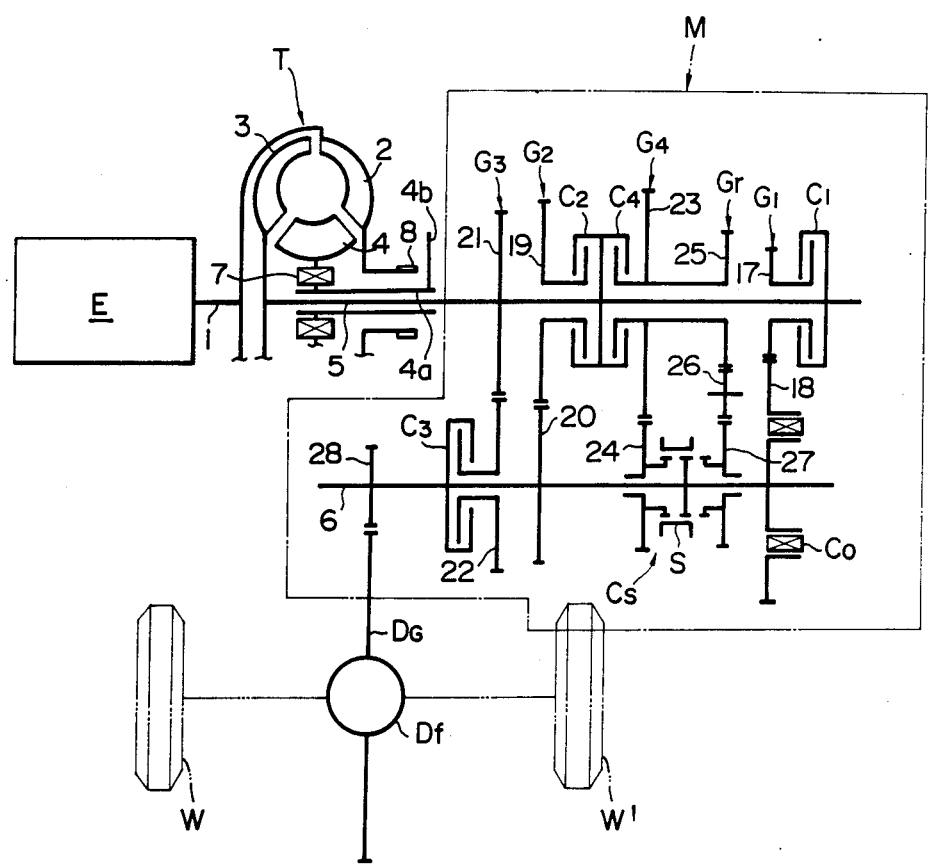
FIG. 1 is a skeleton view, in part block diagrammatical form, of the power train of a vehicle incorporating an automatic transmission which is an embodiment of the present invention.

FIG. 1 schematically shows the power train of a vehicle incorporating a preferred embodiment of the present invention, and particularly shows in skeleton form a gear transmission mechanism M comprised in all said preferred embodiments. Referring to this figure, an engine E drives wheels W, W' of the vehicle via, in order, a torque converter T, said gear transmission mechanism M, and a differential device Df.

Specifically, the crankshaft 1 of the engine E is connected to a pump impeller 2 of the torque converter T. This torque converter T comprises a turbine driven member 3 fixedly mounted on the left hand end of a power input shaft 5 of the gear transmission mechanism M, and a stator member 4 mounted, via a one-way clutch 7, on the left hand end of a hollow stator shaft 4a. The casing (not shown) of this torque converter T is filled with hydraulic fluid, and torque is transmitted and amplified between the pump impeller 2 and the turbine driven member 3 by circulation of this hydraulic fluid, reaction being taken by the stator member 4. The stator shaft 4a is freely rotatably fitted over said power input shaft 5, and on its right hand end is fixed a stator arm 4b, the free end of which is free to move through a certain small distance so as to actuate a regulator valve Vr shown in FIG. 2 as will be described later. And to a mounting shaft of the pump impeller 2 is fixedly attached a pump drive gear 3 for driving an oil pressure pump P shown in FIG. 2. A power output shaft 6 is supported within the casing (not shown) of the gear transmission mechanism M in parallel to the aforementioned power input shaft 5, and a power output gear wheel 28 is mounted on the left hand end of this power output shaft 6 for transmitting output power to a differential gear Dg of the differential device Df meshed with it, from which the wheels W, W' are driven.

Between the power input shaft 5 and the parallel power output shaft 6 there are provided five gear trains G1, G2, G3, G4, and Gr, which are selectively engagable, by the selective engagement of friction engaging means C1, C2, C3, and C4 and of a dog clutch Cs, so as to selectively transfer rotational power from the input shaft 5 to the output shaft 6 at various gearing ratios. These means C1 through C4 and Cs are controlled by selective supplies of actuating pressure from a hydraulic fluid pressure control system. In more detail, the gear train G1, which is for providing the first speed stage of the gear transmission mechanism M, comprises a first speed driving gear 17 rotatably mounted on the power input shaft 5 and selectively engagable thereto by the first speed clutch C1, and a first speed driven gear 18 constantly meshed with said first speed driving gear 17 and engaged, via a one-way clutch Co, to the power output shaft 6. The sense of operation of the one-way clutch Co is such that the torque can be transmitted from the crankshaft 1 of the engine E rotation in its normal rotational direction to the power output shaft 6 to drive the wheels W, W', but not in the reverse direction. The gear train G2, for providing the second speed stage, comprises a second speed driving gear 19 rotatably mounted on the power input shaft 5 and selectively rotatably engagable thereto by the second speed clutch C2, and a second speed driven gear 20 constantly meshed with said second speed driving gear 19 and fixedly mounted on the power output shaft 8. The gear train G3, for providing the third speed stage, comprises a third speed driving gear 21 fixedly mounted on the power input shaft 5 and a third speed driven gear 22 mounted on the power output shaft 8 and constantly meshed with said third speed driving gear 21 and selectively rotatably engagable thereto by the third speed clutch C3. The gear train G4, for providing the fourth speed stage, comprises a fourth speed driving gear 23 rotatably mounted on the power input shaft 5 and selectively rotatably engagable thereto by the fourth speed clutch C4, and a fourth speed driven gear 24 constantly meshed with said fourth speed driving gear 23 and rotatably mounted on the power output shaft 8 and selectively engagable thereto via the dog clutch Cs, when the sleeve S thereof is shifted to the left. And the gear train Gr, for providing the reverse speed stage, comprises a reverse speed driving gear 25 integrally formed with the fourth speed driving gear 23 and therefore also selectively rotationall engageable to the power input shaft 5 by the fourth speed clutch C4, a reverse speed idler gear 26 constantly meshed with said reverse speed driving gear 25, and a reverse speed driven gear 27 constantly meshed with said reverse speed idler gear 26 and rotatably mounted on the power output shaft 6 and selectively engagable thereto via the dog clutch Cs, when the sleeve S thereof is shifted to the right.

Thus, when the first speed stage is to be provided, only the first speed clutch C1 is supplied with actuating pressure to engage it, and the sleeve S of the dog clutch Cs is kept shifted leftwards. In this state, the rotation of the power input shaft 5 is transmitted via the clutch C1 and the first speed driving and driven gears 17 and 18, i.e. through the first speed stage gear train G1, to the power output shaft 6, and is then transmitted therefrom via the gears 28 and Dg and the differential device Df to the wheels W, W' of the vehicle, at a gearing ratio appropriate to the first speed stage. When the second speed stage is to be provided, the supply of actuating pressure to the first speed clutch C1 is continued, and additionally the second speed clutch C2 is supplied with actuating pressure, while the clutches C3 and C4 are not supplied with actuating pressure, and the sleeve S of the dog clutch Cs is still kept shifted to its leftmost position. In this state, the rotation of the power input shaft 5 is transmitted via the clutch C2 and the second speed driving and driven gears 19 and 20, i.e. through the second speed stage gear train G2, to the power output shaft 6 and thence to the wheels W, W', at a gearing ratio now appropriate to the second speed stage. Meanwhile, although the first speed clutch C1 is still kept engaged, because of the overrunning operation of the one-way clutch Co which now free wheels, no problem is caused, and a smooth upshift from the first speed stage to the second speed stage becomes possible. In fact, the first clutch C1 is kept engaged during the engagement of all the higher speed stages, because if it were disengaged, the problem might occur that dragging of the one-way clutch Co might cause the engagement members of said first clutch C1 to constantly be moving relative to one another, which could cause undesirable wear on these engagement members and thus could cause damage to the first clutch C1 by the generation of heat therein.

Further, when the third speed stage is to be provided, the supply of actuating pressure to the first speed clutch C1 is continued, and additionally the third speed clutch C3 is now supplied with pressure to engage it, while the supply of actuating pressure to the second speed clutch C2 is now ceased and also the fourth speed clutch C4 is still not supplied with actuating pressure, and the sleeve S of the dog clutch Cs is still kept shifted to its leftmost position. Now, the rotation of the power input shaft 5 is transmitted via the third speed driving and driven gears 21 and 22 and the clutch C3, i.e. via the third speed stage gear train G3, to the power output shaft 6 and thence to the wheels W, W', at a gearing ratio now appropriate to the third speed stage. Again, the one-way clutch Co now free wheels. Yet further, when the fourth speed stage is to be provided, the supply of actuating pressure to the first speed clutch C1 is continued, and additionally the fourth speed clutch C4 is now supplied with pressure to engage it, while the supply of actuating pressure to the third speed clutch C3 is now ceased and also now the second speed clutch C2 is still not supplied with actuating pressure, and the sleeve S of the dog clutch Cs is still kept shifted to its leftmost position. In this state, the rotation of the power input shaft 5 is transmitted via the clutch C4 and the fourth speed driving and driven gears 23 and 24, i.e. via the fourth speed stage gear train G4, to the power output shaft 6 and thence to the wheels W, W', at a gearing ratio now appropriate to the fourth speed stage. Again, the one-way clutch Co now free wheels. When the gear transmission mechanism M is to be set to the neutral state, then none of the clutches C1 through C4 is supplied with actuating pressure, and in this state no rotational power transfer is available between the power input shaft 5 and the power output shaft 6. Finally, when the reverse speed stage is to be provided, from the neutral state described above first the sleeve S of the dog clutch Cs is shifted to its rightmost position, and then only the fourth speed clutch C4 is supplied with pressure to engage it, while no actuating pressure is supplied to the other clutches C1 through C3. In this state, the rotation of the power input shaft 5 is transmitted via the clutch C4, the reverse speed driving gear 25, the reverse idler gear 26, and the reverse speed driven gear 27 and the dog clutch Cs, i.e. via the reverse speed stage gear train Gr, to the power output shaft 6 to the wheels W, W', at a gearing ratio appropriate to the reverse speed stage, and now in the reverse rotational direction, due to the additional interposition of the reverse idler gear 26. At this time, the first speed clutch C1 must not be engaged.

Figure 2:
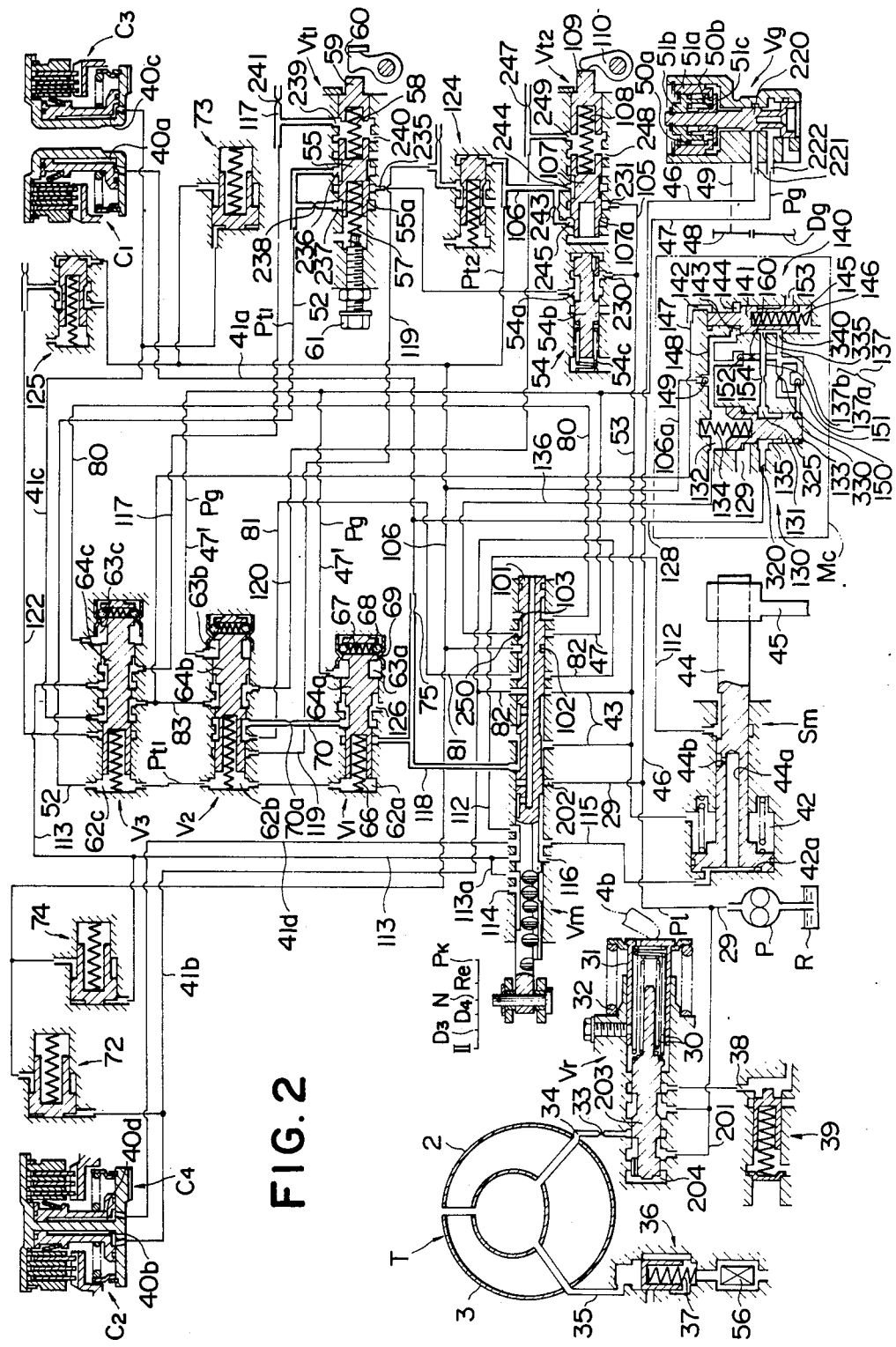
FIG. 2 is a detailed hydraulic fluid pressure circuit diagram of a control device for the first preferred embodiment of the automatic transmission of the present invention.

Now the structure and operation of the hydraulic fluid pressure control system shown in FIG. 2 for the gear transmission mechanism M, incorporated in the first preferred embodiment of the present invention, will be explained. This control system comprises a hydraulic fluid reservoir R, a pump P, a line pressure regulator valve Vr, a manual range setting valve Vm, a governor pressure regulation valve Vg, two throttle pressure regulation valves Vt1 and Vt2, three speed shifting valves V1, V2 and V3, and an anti creep device Mc which relates to the gist of the present invention. FIG. 2 also shows the torque converter T and portions of the four clutches C1 through C4 described above, which have respective pressure chambers 40a through 40d for supply of pressure for engaging them, and further shows the actuator Sm for the dog clutch Cs.

The pump P sucks up hydrualic fluid from the reservoir R and supplies it under pressure to the conduit 29. The line pressure regulator valve Vr vents some of this fluid through a conduit 201 so as to regulate the pressure in the conduit 29 to a line pressure P1, which is then supplied to a port 202 of the manual range setting valve Vm, and via a conduit 46 to the governor valve Vg.

This line pressure regulator valve Vr comprises a valve element 203 which reciprocates in a bore formed in a housing, and the pressure in the conduit 201 is fed to a chamber defined at the left end of the valve element 203, which is thus biased rightwards by this pressure and also leftwards by the force of a compression coil spring 30 the other end of which is supported in a spring receiving tube 31 which slides in the valve bore. The tube 31 is biased rightwards by a compression coil spring 32 and is biased leftwards by pressure exerted by the end of the aforementioned stator arm 4b fixedly mounted on the stator shaft 4a. When the valve element 203 moves rightwards by more than a certain distance due to the rise in line pressure P1 the pressurized hydraulic fluid in the chamber 204 is introduced via a throttling device 33 and a conduit 34 to the interior of the torque converter T for preventing cavitation. Thus, the greater is the torque produced on the stator member 4, the further is the tube 31 pushed to the left by the stator arm 4b, the greater biasing force does the spring 30 apply to the valve element 203, and accordingly the greater is the value P1 of the line pressure regulated to be. The pressure maintained inside the torque converter T is determined by the flow resistance of the throttling device 33 and by the force of the spring 37 of a check valve 36 provided in a drain path 35 for the torque converter, a filter 56 being provided after said check valve 36 in said drain path. And some of the hydraulic fluid vented from the conduit 201 by the line pressure regulator valve Vr is fed through a conduit 38 to various parts which are to be lubricated; for securing a minimum necessary lubrication pressure, a pressure control valve 39, which will not be particularly explained, is provided on this conduit 38.

The per se known governor valve Vg comprises a valve element 220 which reciprocates in a bore formed in a housing which is rotated as a whole by a shaft 49 affixed to said housing perpendicularly to said bore which is driven at a rotational speed proportional to vehicle road speed by a gear 48 engaged with the drive gear Dg of the differential device Df. Line pressure P1 is supplied through the conduit 46 to a port 221 of the governor valve Vg. Three weights 51a, 51b, and 51c under the action of centrifugal force and also two springs 50a and 50b bias the valve element 220 in the upward direction to communicate the port 221 with another part 222, while the hydraulic fluid pressure at said port 222 biases said valve element 220 in the downward direction to break said communication. Therefore, by a feedback process, the value of the pressure Pg, hereinafter called the governor pressure, available at the port 222 is caused to be substantially proportional to the speed of rotation of the governor valve Vg, i.e. to vehicle road speed.

The manual range setting valve Vm comprises a valve element 101 which reciprocates in a bore formed in a housing, and the valve element 101 can be positioned by the use of a manual transmission shift lever not shown in the figures to any one of six positions: a parking range position Pk, a reverse range position Re, a neutral range position N, a D4 range position in which all four forward speed stages of the gear transmission mechanism M are made available, a D3 range position in which the first, second, and third speed stages are made available but the fourth speed stage is not made available, and a II range position in which the first and second speed stages are made available but the third and fourth speed stage are not made available.

OPERATION IN NEUTRAL RANGE

When the valve element 101 of the manual range setting valve Vm is positioned to the neutral range position N as shown in FIG. 2, no actuating supply of line pressure is supplied to any of the pressure chambers 40a through 40d of the four clutches C1 through C4, or to any others of the various pressure actuated mechanisms of the transmission, because the line pressure supplied to the port 202 of said valve Vm is intercepted there and is not supplied to any other port, and thus all the clutches are disengaged and the gear transmission mechanism M is in the neutral state and provides no power transmission between the engine E and the wheels W, W'.

OPERATION IN D4 RANGE

When the valve element 101 of the manual range setting valve Vm is shifted by one step to the left front its position shown in FIG. 2 to the D4 range position, then the port 202 is communicated to ports which lead to the conduits 43 and 118, and thus the line pressure P1 is supplied thereto. The line pressure P1 in the conduit 118 is supplied through a throttling device 75 and a conduit 41a to the pressure chamber 40a of the first clutch C1 to engage it; but a diverting conduit 128 is branched off from the conduit 41a to the anti creep device Mc, and in some circumstances which will be explained later via this conduit 128 the pressure in said conduit 41a is reduced. Also, in this position of the manual valve Vm, ports which are connected to conduits 47 and 80 are communicated together, thus joining these conduits; and also ports which are connected to conduits 81 and 82 are communicated together, thus joining these conduits. The conduit 82 leads to a conduit 41b which leads to the pressure chamber 40b of the second clutch C2. Further, ports which are connected to conduits 113 and 113a are discommunicated from a port which is connected to a conduit 114, and ports which are connected to conduits 112 and 115 are communicated to a drain port 116. The line pressure P1 thus supplied to the conduit 43 is conducted to a pressure chamber 42 of the actuator Sm for the dog clutch Cs, and impels the piston 44 thereof to the left, so as via a selector fork 45 (not fully shown) to shift the selector sleeve S to the left as seen in FIG. 1, thus engaging the fourth speed driven gear 24 to the power output shaft 6 while disengaging the reverse speed driven gear 27 therefrom.

The line pressure Pl in the conduit 43 is supplied via a conduit 53 to a port 230 of a modulator valve 54 and via a conduit 105 to a port 231 of a second throttle valve Vt2. The modulator valve 54 comprises a valve element 54b which reciprocates in a bore formed in a housing, and the pressure at its output port 54a is fed via a hole in the valve element 54b to a chamber defined at the right end of the valve element 54b, which is thus biased leftwards by this pressure while it is biased rightwards by the force of a compression coil spring 54c in the valve bore. When the valve element 54b moves to the left by more than a certain amount, it discommunicates the ports 230 and 54a from one another. Thus, the pressure at the output port 54a is modulated to be no more than a certain predetermined pressure. This modulated line pressure is supplied to a port 235 of the first throttle valve Vt1.

The per se known first throttle valve Vt1 provides a pressure signal, hereinafter called the first throttle pressure Pt1, which is indicative of engine output, and comprises a valve element 55 which reciprocates in a bore formed in a housing. The valve element 55 is biased rightwards by the right end of a compression coil spring 57, the left end of which is supported by an adjustment screw 61, and is biased leftwards by the left end of a compression coil spring 58, the right end of which is supported by a control piston 59 which slides in the valve bore and which is pushed to the left by a cam 60 which is coupled to the accelerator pedal of the vehicle. As the accelerator pedal is depressed and the engine output increases, the cam 60 is turned counterclockwise in the figure, so as to push the piston 59 leftwards and so as to increase the leftwards force on the valve element 55. When the valve element 55 moves to the left by more than a certain distance, the input port 235 of the first throttle valve Vt1 (to which is being supplied a regulated pressure as explained above) is communicated to an output port 236 thereof so as to supply pressure thereto. The pressure at this port 236 is fed back, via a throttling device 238, to a control port 237 of the first throttle valve Vt1, and acts on a pressure receiving area on the valve element 55 defined by a step 55a thereon so as to bias said valve element 55 to the right. Thus, by a feedback process, the pressure at the output port 236 is made to be representative of the position of the cam 60, i.e. of engine output. This first throttle pressure Pt1 is supplied to a conduit 52. Also, as a subsidiary function, at a certain point in the rotation of the cam 60 counterclockwise, i.e. at a certain value of engine output, a port 239 of the first throttle valve Vt1 is discommunicated from a drain port 240, i.e. a conduit 117 is no longer drainable through said port 239 and thus is only drained at a higher flow resistance than heretofore through a throttling device 241.

The per se known second throttle valve Vt2 provides another pressure signal, hereinafter called the second throttle pressure Pt2, which is also indicative of engine output although possibly with a different functional relationship thereto (this is the reason for the provision of two throttle valves), and comprises a valve element 107 which reciprocates in a bore formed in a housing. The valve element 107 is biased leftwards by the left end of a compression coil spring 108, the right end of which is supported by a control piston 109 which slides in the valve bore and which is pushed to the left by a cam 110 which is, like the cam 60, coupled to the accelerator pedal of the vehicle. As the engine output increases, the cam 110 is turned counterclockwise in the figure, so as to push the piston 109 leftwards and so as to increase the leftwards force on the valve element 107. When the valve element 107 moves to the left by more than a certain distance, the input port 231 of the second throttle valve Vt2 is communicated to an output port 244 thereof so as to supply line pressure thereto. The pressure at this port 244 is fed back, via a throttling device 243, to a control port 245 of the second throttle valve Vt2, and acts on a pressure receiving area on the valve element 107 defined by a step 107a thereon so as to bias said valve element 107 to the right. Thus, by a feedback process, the pressure at the output port 244 is made to be representative of the position of the cam 110, i.e. of engine output. This second throttle pressure Pt2 is supplied to a conduit 106. Also, as a subsidiary function, at a certain point in the rotation of the cam 110 counterclockwise, i.e. at a certain value of engine output, a port 249 of the second throttle valve Vt2 is discommunicated from a drain port 248, i.e. a conduit 120 is no longer drainable through said port 248 and thus is only drained at a higher flow resistance than heretofore through a throttling device 247.

Three shifting valves V1, V2, and V3 are provided for controlling the shifting of the transmission between, respectively, the first and second speed stages, the second and third speed stages, and the third and fourth speed stages. Each of these valves comprises a valve element which reciprocates in a bore formed in a housing, these valve elements respectively being designated as 64a, 64b, and 64c. The first throttle pressure Pt1 produced by the first throttle valve Vt1 is transmitted through the conduit 52 to pressure chambers 62a, 62b, and 62c, defined in the bores of the valves V1, V2, and V3 at the left ends of their valve elements 64a, 64b, and 64c respectively. Also, the governor pressure Pg produced by the governor value Vg is transmitted through a conduit system 47′ branched from the conduit 47 to pressure chambers 63a and 63b defined in the bores of the first/second shifting valve V1 and the second/third shifting valve V2 at the right ends of their valve elements 64a and 64b respectively; and further, when and only when the manual range setting valve Vm is shifted to the D4 range position, said governor pressure Pg is transmitted through a conduit 80, which at this time only is communicated via said manual valve Vm to the conduit 47, to a pressure chamber 63c defined in the bore of the third/fourth shifting valve V3 at the right end of its valve element 64c.

In the first/second shifting valve V1, the valve element 64a is biased rightwards by a compression coil spring 66 mounted in the pressure chamber 62a, and further in the pressure chamber 63a of said valve V1 a per se known detent mechanism is provided, comprising a pair of balls 68 mounted in a diametrically extending passage in the valve element 64a and biased radially outwards by a compression coil spring 67 mounted between them and a pair of projections 69 over which these balls 68 must ride if the valve element 64a is to move leftwards from its position shown in the drawing. Similar biasing springs and detent arrangements are provided for the other two shifting valves V2 and V3, but their parts are not specifically designated by any reference numerals. Thus, each of the valve elements 64a, 64b, and 64c of the valves V1, V2, and V3 respectively is positioned, under the modifying influence of the relevant aforesaid detent mechanism, according to the preponderance between a leftwards force applied by the governor pressure Pg in the pressure chamber 63a, 63b, and 63c respectively which is representative of vehicle road speed, and the sum of the biasing force of said spring and of a rightwards force applied by the first throttle pressure Pt1 in the pressure chamber 62a, 62b, and 62c respectively which is representative of engine output. This means that, when the vehicle is at rest and governor pressure Pg is substantially zero, the valve elements 64a, 64b, and 64c are positioned rightwards in their bores by the biasing actions of the springs. Further, as per se conventional, the forces of the biasing springs and the areas of the ends of the valve elements 64a, 64b, and 64c are so arranged that, as the governor pressure Pg gradually increases relative to the first throttle pressure Pt1, first the valve element 64a of the first/second shifting valve V1 moves leftwards; then later the valve element 64b of the second/third shifting valve V2 moves leftwards; and only last, later, does the valve element 64c of the third/fourth shifting valve V3 move leftwards. And, similarly, as the governor pressure Pg gradually decreases relative to the first throttle pressure Pt1, this upshifting order is repeated in reverse for downshifting.

Thus, when the throttle pedal is applied while the vehicle is at rest with the transmission in D4 range position, and for the moment ignoring the action of the anti creep device Mc, line pressure is supplied from the manual range setting valve Vm through the conduit 118 and the throttling device 75 to the pressure chamber 40a of the first clutch C1, but none of the other clutches C2 through C4 are engaged because (vide infra) the conduit 118 is discommunicated by the valve V1 from a conduit 70, so that first speed stage is provided by the gear transmission mechanism M by the first speed gear train G1 being engaged. And, as the throttle pedal is depressed, the vehicle moves away from rest in this first speed stage, and thus the governor pressure Pg starts to increase.

When the difference between this governor pressure Pg and the first throttle pressure Pt1 increases beyond a certain value, then the valve element 64a of the first-/second shifting valve V1, after overcoming the action of the detent mechanism, moves leftwards against the action of the spring 66 and the first throttle pressure Pt1 which are being applied thereto. In this operational state, the line pressure P1 present in the conduit 118 is conducted, via ports of the first/second shifting valve V1 which are now communicated together, to the conduit 70, instead of this conduit 70 being drained through a drain port 126 as was formerly the case. After passing through a throttling device 70a, this line pressure reaches the second/third shifting valve V2 and, since the valve element 64b thereof is still in its rightwards shifted position, is conducted through ports which are presently communicated together to a conduit 81. In this D4 range position of the manual range setting valve Vm, it communicates the other end of this conduit 81 to a conduit 82, and the line pressure P1 is thence conducted to a conduit 41b which leads it to the pressure chamber 40b of the second clutch C2 to engage it. An accumulator 72 is provided for cushioning the engagement shock of this second clutch C2, and its effect is regulated by the second throttle pressure Pt2, which is conducted to it from the conduit 106 in a per se known way. Thus, the upshift from the first to the second speed stage is accomplished. Now, the second speed gear train G2 is engaged, with both the first and second clutches C1 and C2 engaged, and with the other clutches C3 and C4 disengaged.

When governor pressure Pg continues to increase as road speed increases, and the difference between this governor pressure Pg and the first throttle pressure Pt1 becomes greater than another certain value, then the valve element 64b of the second/third shifting valve V2, after overcoming the action of the detent mechanism of this valve, moves leftwards against the action of the spring thereof and the first throttle pressure Pt1. In this operational state, the line pressure P1 present in the conduit 70 is conducted through ports of the second/third shifting valve V2 which are now communicated together to a conduit 83, instead of this conduit 83 being communicated to the conduit 120 to which it was formerly communicated for draining, while the conduit 81 is now drained via the conduit 119, so that the second clutch C2 is disengaged. This line pressure in the conduit 83 is led to the third/fourth shifting valve V3 and, since the valve element 64c thereof is still in the rightwards shifted position, is conducted through ports which are presently communicated together to a conduit 41c which leads it to the pressure chamber 40c of the third clutch C3 to engage it. An accumulator 73 is provided to the conduit 106 for cushioning the engagement shock of this third clutch C3, and again its effect is regulated by the second throttle pressure Pt2 which is conducted thereto via the conduit 106. Thus, the third speed gear train G3 is engaged, with the first and third clutches C1 and C3 engaged, and with the other clutches C2 and C4 disengaged.

When governor pressure Pg continues to increase further as road speed further increases, and the difference between this governor pressure Pg and the first throttle pressure Pt1 becomes greater than yet another certain value, then the valve element 64c of the third-/fourth shifting valve V3, after overcoming the action of the detent mechanism of this valve, moves leftwards against the action of the spring thereof and the first throttle pressure Pt1 which are being applied thereto. In this operational state, the line pressure P1 present in the conduit 83 is no longer supplied to the conduit 41c and thencefrom to the pressure chamber 40c of the third clutch C3, but instead this conduit 41c is drained via a conduit 122, so that the third clutch C3 is disengaged. And instead the line pressure P1 present in the conduit 83 is conducted to a conduit 113, which is now disconnected from a drain passage 117 to which it was formerly communicated for draining. This line pressure is led through ports of the manual setting valve Vm which are currently communicated together to a conduit 41d which leads it to the pressure chamber 40d of the fourth clutch C4 to engage it. An accumulator 74 is provided for cushioning the engagement shock of this fourth clutch C4, and again its effect is regulated by the second throttle pressure Pt2, which is conducted to it by the conduit 106. Thus, the fourth speed gear train G4 is engaged, with the first and fourth clutches C1 and C4 being engaged, and with the other clutches C2 and C3 being disengaged.

During the reverse process, i.e. when the vehicle is being slowed down from a high road speed with the transmission engaged to the fourth speed stage, the above described transitions occur in the reverse order and direction to those explained above. In the fourth to third downshift, the pressure chamber 40d of the fourth clutch C4 is drained via the conduit 113, the valve V3, and the conduit 117, and in the third to second downshift the pressure chamber 40c of the third clutch C3 is drained via the conduit 41c, the valves V3 and V2, and the conduit 120. The flow resistances with which these conduits 117 and 120 are drained are varied according to engine output; this is for helping to provide smooth downshifting. Likewise, as mentioned above, during the upshift from the second speed stage to the third speed stage, the pressure chamber 40b of the second clutch C2 is drained via the valve V2 and the conduit 119, and during the upshift from the third speed stage to the fourth speed stage the pressure chamber 40c of the third clutch C3 is drained via the valve V3 and the conduit 122. By the action, in conjunction with throttling devices 124a and 125a, of upshift smoothing valves 124 and 125, respectively, which are controlled by supply through the conduit 106 of the second throttle pressure Pt2, the flow resistances with which these conduits 119 and 122 are drained are varied according to engine output; this is for providing smooth upshifting, and does not form part of the present invention, being an example of an inventive concept developed by a different inventive entity than that of the present application and assigned to the same assignee as the present application, for which inventive concept it is known to the present inventors that U.S. patent application Ser. No. 650,359 copending to the present application has been filed.

OPERATION IN D3 RANGE

When the valve element 101 of the manual range setting valve Vm is shifted by two steps to the left from its position shown in FIG. 2 to the D3 range position, then the only difference that occurs from the case described above of operation with said valve Vm set to the D4 range position is that the conduit 80 is cut off from the conduit 47, by discommunication of ports of said valve Vm which in the case of the D4 range were communicated together, and hence no governor pressure Pg is supplied to the pressure chamber 63c of the third-/fourth shifting valve V3, and thus no upshift from the third speed stage to the fourth speed stage can ever occur. However, the shifts between the first and second speed stages and between the second and third speed stages are unaffected. From the shown construction of the manual range setting valve Vm, it might appear that in this D3 range position the conduit 81 is discommunicated from the conduit 82, but in fact this is not the case because the ports to which these two conduit are connected are communicated, at this time, via an annular groove 102 formed in the valve element 101 of the valve Vm.

OPERATION IN II RANGE

When the valve element 101 of the manual range setting valve Vm is shifted by three steps to the left from its position shown in FIG. 2 to the II range position, then the supply of line pressure P1 from the conduit 29 to the conduit 118 is interrupted by discommunication of ports of said valve Vm which were communicated in the previously explained operational cases, and instead said conduit 118 is communicated to a drain passage, so that definitely no pressure is supplied to the pressure chambers 40a, 40c, or 40d, and accordingly the first, third, and fourth clutches C1, C3, and C4 are always disengaged. However, the conduit 82 is communicated to the conduit 43 via the annular groove 102 mentioned above, and accordingly line pressure P1 (which is present in said conduit 43 since it is communicated with the conduit 29 via the valve Vm) is supplied via the conduit 80 and the conduit 41b to the pressure chamber 40b of the second clutch C2, thus engaging it. Thus, in this operational mode, the transmission is kept permanently set in the second speed stage, with the second speed gear train G2 engaged, and no downshifting to the first speed stage therefrom, and no upshifting, are possible.

OPERATION IN REVERSE RANGE RE

When the valve element 101 of the manual range setting valve Vm is shifted by one step to the right from its position shown in FIG. 2 to the reverse range position Re, then the supply of line pressure P1 from the conduit 29 to the conduit 43 via said valve Vm is interrupted, and instead said conduit 43 is communicated to a drain port, while the line pressure P1 in the conduit 29 is instead supplied via the valve Vm to the conduit 115 which no longer is connected to the drain port 116. Thus, the pressure chamber 42 of the actuator Sm for the dog clutch Cs is no longer supplied with line pressure, but instead the other pressure chamber 42a of said actuator Sm is pressurized; and hence now the piston 44 thereof is impelled to the right, so as via the selector fork 45 to shift the selector sleeve S to the right as seen in FIG. 1, thus engaging the reverse speed driven gear 27 to the power output shaft 6 so as to connect the reverse speed gear train Gr while disengaging the fourth speed driven gear 24 therefrom. Also, the line pressure P1 is fed from the chamber 42a through an axial hole 44a and a radial hole 44b in the piston 44 to a conduit 112, so as to be communicated via the valve Vm and via the conduit 41d to the pressure chamber 40d of the fourth clutch C4, thus engaging it, as is required for reverse operation as detailed above with respect to FIG. 1. Thus, in this operational mode, the transmission is kept permanently set in the reverse speed stage.

ANTI CREEP DEVICE MC

Now, the anti creep device Mc will be explained. This anti creep device embodies several inventive concepts, both that of the present invention and that of another invention developed by a different inventive entity than the present application and assigned to the same assignee as the present application, for which inventive concept it is known to the present inventors that U.S. patent application Ser. No. 650,359 copending to the present application has been filed. Both of these inventive concepts will be described herein, since both of them are relevant to the understanding of the operation of the first preferred embodiment of FIG. 2; but it should be understood that the scope of the present invention is to be delimited by the claims of this application, since the present inventors did not develop the entire shown structure by themselves.

In this first preferred embodiment, the anti creep device Mc interferes with the supply of actuating pressure for the pressure chamber 40a of the first clutch C1 to engage it, by draining some or all of this actuating pressure off through a diverting conduit 128 which leads to said anti creep device Mc, and the action of the throttling element 75 means that this prevents substantial actuating pressure from reaching the first clutch C1.

The anti creep device Mc in this first preferred embodiment comprises an anti creep control valve 130 for providing anti creep action in certain circumstances and an override valve 140 for overriding the action of said anti creep control valve 130 and positively preventing anti creep action, in certain circumstances. The anti creep device Mc receives supply of three information input signals: the second throttle pressure Pt2, brought to it through a conduit 106a branched off from the conduit 106; the pressure in the conduit 83, which is equal to line pressure when and only when the transmission is operating in either the third or the fourth speed stage and is otherwise substantially zero, brought to it through a conduit 147 branched off from the conduit 83; and information available from the pressure and flow resistance presented by a conduit 136, the other end of which is connected to a port 250 of the manual range shifting valve Vm which: is communicated via a groove 103 in the valve element 101 thereof to a port connected to the conduit 106 which carries the second throttle pressure Pt2, when and only when said manual valve Vm is set to the D4 range position; is communicated to a drain port when said manual valve Vm is set to the neutral range position N; and is otherwise not communicated to any other port. And the anti creep device Mc provides its information output signal by selectively communicating said diverting conduit 128 from the conduit 41a to a drain port 129 of the control valve 130, to lower the pressure in said conduit 41a selectively.

The anti creep control valve 130 comprises a bore formed in a housing and a valve element 131 which reciprocates in said bore, and when said valve element 131 is in its downwards position as seen in FIG. 2 it discommunicates a port 320 connected to said conduit 128 from said drain port 129, whereas when said valve element 131 is in its upwards position it communicates said port 320 to said drain port 129. The port 320 is always communicated to a port 325, via an annular groove 135 formed on the valve element 131. A first pressure chamber 132 is defined at the upper end of the bore of the valve 130, within which a compression coil spring 134 is mounted for biasing the valve element 131 downwards; and a second pressure chamber 133 is defined at the lower end of the bore of the anti creep control valve 130. As a special feature of the shown first preferred embodiment, the pressure receiving area of the top end of the valve element 131, exposed to the pressure in the first pressure chamber 132, is made to be larger than the pressure receiving area of the bottom end of the valve element 131, exposed to the pressure in the second pressure chamber 133. The first pressure chamber 132 is connected to the end of the conduit 136, the pressure and flow resistance presented by which are explained above, and is also connected to one end of a conduit 148 which leads to the override valve 140 to supply a control pressure to it. A port 330 opens to the second pressure chamber 133.

The override valve 140 comprises a bore formed in a housing and a valve element 141 which reciprocates in said bore, and when said valve element 141 is in its upwards position as seen in FIG. 2 it discommunicates a first switched port 340 from a drain port 153 and instead communicates said port 340 to a second switched port 335, whereas when said valve element 141 is in its downwards position it communicates said port 340 to said drain port 153 and discommunicates it from said port 335 which is now communicated to no other port. A first pressure chamber 142 is defined at the upper end of the bore of the valve 140; a second pressure chamber 144 is defined at a mid point of the bore of the valve 140, at a place thereof at which the valve element 141 is formed with an upwardly facing step 143 for receiving a control pressure for biasing said valve element 141 downwards; and a third chamber 145 is defined at the lower end of the bore of the valve 130, within which a compression coil spring 146 is mounted for biasing the valve element 141 upwards. The first pressure chamber 142 is connected to the end of the conduit 147, and thus is supplied with the pressure in the conduit 83, which as previously specified is present when and only when the transmission is functioning in the third or the fourth speed stage. The second pressure chamber 144 is connected to the other end of the conduit 148, and thus is communicated to the first pressure chamber 132 of the anti creep control valve 130. The third chamber 145 is merely communicated to a drain port. And the second switched port 335 of the valve 140 is connected to one end of a conduit 137a, the other end of which is connected to the port 325 of the anti creep control valve 130, said conduit 137a having a throttling element 154 therein, while the first switched port 340 of the valve 140 is connected to one end of a conduit 137b, the other end of which is connected to the port 330 of the anti creep control valve 130 and thus to the second pressure chamber 133 thereof, said conduit 137b having a throttling element 150 therein. Thus, in combination, the conduits 137a and 137b constitute a conduit system communicating the port 325 of the anti creep control valve 130 to the second pressure chamber 133 thereof, said conduit system being selectively interruptable by the switching action of the override valve 140; and when such interruption of the conduit system 137 is so performed said second pressure chamber 133 of the valve 130 is drained via the port 153. Also, a one-way valve 151 is connected in parallel with the throttling element 150 in the conduit 137b and allows substantially free flow of hydraulic fluid out from the second pressure chamber 133 towards the override valve 140 but not in the reverse direction, and further the series connection of another one-way valve 152 and another throttling element 160 is connected between a point on said conduit 137b between the throttling element 150 and the port 340 of the override valve 140 and a point intermediate on the conduit 148, and allows a restricted flow of hydraulic fluid out from said conduit 137b towards said conduit 148 but not in the reverse direction. Finally, a point intermediate on the conduit 148 is connected to the downstream end of the conduit 106a for receiving supply of the second throttle pressure Pt2, via a one-way valve 149 which allows substantially free flow of hydraulic fluid from the conduit 106a into the conduit 148 but not in the reverse direction.

Now, this anti creep means Mc functions as follows.

ANTI CREEP OPERATION IN D4 RANGE

First, assume that the valve element 101 of the manual range setting valve Vm is shifted by one step to the left from its position shown in FIG. 2 to the D4 range position. In this case, the second throttle pressure Pt2 is supplied to the first pressure chamber 132 of the anti creep control valve 130 via the conduit 106a and the one-way valve 149 and the conduit 148, and also is supplied to said first pressure chamber 132 via the conduit 136 from the manual range setting valve Vm, since as defined above at this time the port 250 thereof is connected to supply of said second throttle pressure Pt2 from the conduit 106 via the groove 103 on the valve element 101.

Now, consider the operational condition of the vehicle when it is stationary with the engine E in the idling state. At this time, the three shifting valves V1, V2, and V3 will all be in their states with their respective valve elements 64a, 64b, and 64c shifted rightwards as shown in FIG. 2, and hence the transmission will be set to its first speed stage, with no pressure being supplied to any of the second through the fourth clutches C2 through C4, and with pressure being provided to the conduit 41a in the direction towards the first clutch C1, as explained previously. And no pressure is currently present in the conduit 83, since neither the third nor the fourth speed stage of the transmission is engaged, so no pressure is conducted to the first pressure chamber 142 of the override valve 140 through the conduit 147. Also, since the second throttle pressure Pt2 is substantially zero at this time, no substantial pressure is present in the first pressure chamber 132 of the anti creep control valve 130 or in the second pressure chamber 144 of the override valve 140. Therefore, the valve element 141 of the override valve 140 is shifted, by the biasing action of the spring 146, to its upward position as shown in FIG. 2, thus communicating the ports 335 and 340. At this time, therefore, the pressure present in the conduit 41a for actuating the first clutch C1 is diverted through the conduit 128 to the port 320 of the anti creep control valve 130, and is conducted through the conduit system 137 and through the override valve 140 and the throttling elements 154 and 150 (but not through the one-way valve 151) to the second pressure chamber 133 of said anti creep control valve 130. Although this second pressure chamber 133 is being somewhat vented via the one-way valve 151, the throttling element 160, and the one-way valve 152 to the conduit 148, which is vented to drain through the second throttle valve Vt2 (which is not producing any substantial second throttle pressure Pt2 at this time) via the conduit 136, the groove 103 in the valve element 101 of the manual range setting valve Vm, and the conduit 106, nevertheless, by the provision of the throttling element 160 which has a substantially greater flow resistance than the series combination of the throttling elements 150 and 154, the pressure value in the pressure chamber 133 is not substantially disturbed. At this time, therefore, the valve element 131 of the anti creep control valve 130 is only biased downwards by the spring 134 which is relatively weak and by no other force, and is accordingly displaced upwards, by the aforesaid pressure in its second pressure chamber 133, to a sufficiently upwards position for the port 320 to be somewhat communicated with the drain port 129 and for most of the pressure in the conduit 128 to be vented to said drain port 129, until of course the pressure in the conduit system 137 and the second pressure chamber 133 of the valve 130 is thereby caused to drop so low as to allow the valve element 131 to move downwards again to almost discommunicate the port 320 from the drain port 129. Thus, a balance position is attained for the valve element 131, in which very substantial although not complete venting is being provided for the conduit 128 through the drain port 129. In fact, the equilibrium pressure obtained in this conduit 128 is determined by the spring constant of the spring 134 and by the relative flow resistances of the throttling elements 150 and 151 and 160. Thus, the anti creep device Mc in this operational state greatly lowers the pressure in the conduit 41a, providing a basic engine idling operating pressure denoted by $P_A$ in the graph of FIG. 5, which is a graph of the operating pressure of the first clutch C1 against the second throttle pressure Pt2 in this D4 drive range first speed stage operation, and accordingly the first clutch C1 is substantially prevented from engagement in this stationary state of the vehicle when the throttle pedal is not being depressed (although the small pressure $P_A$ is being provided thereto to keep it ready for engagement); and accordingly anti creep action is provided.

Next, suppose that from this vehicle stationary engine idling state in which anti creep is being provided the accelerator pedal of the vehicle is depressed, so that the second throttle pressure Pt2 increases. This second throttle pressure Pt2 is supplied to the first pressure chamber 132 of the anti creep control valve 130 and also to the second pressure chamber 144 of the override valve 140. Until the valve element 141 of this override valve 140 moves downwards, which it will do when the second throttle pressure Pt2 reaches a certain predetermined value denoted in the graph of FIG. 5 by $P_B$, it causes no action; and in this phase of operation the rising second throttle pressure Pt2 in the first pressure chamber 132 of the valve 130 functions to aid the biasing action of the compression coil spring 134 of this valve in pushing the valve element 131 downwards. The balancing action of this valve 130, in which the pressure in the second pressure chamber 133 is maintained to be just high enough to just enough raise the valve element 135 to partially communicate the port 320 to the drain port 129 so as partly to drain off some of the pressure in the conduit 128, continues as explained above, but now the equilibrium pressure finally produced in this conduit 128 is determined by the spring constant of the spring 134 and by the pressure in the first pressure chamber 132, and the rate of its rise relative to the rise in said first pressure chamber 132 as the accelerator pedal is further depressed is determined by the ratio of the areas of the pressure receiving surfaces of the valve element 135 presented to the first and second pressure chambers 132 and 133; that is, the slope of the sloping portion of the graph of FIG. 5 is determined by this area ratio.

However, when the second throttle pressure Pt2 reaches said certain predetermined value $P_B$, then the pressure in the second pressure chamber 144 of the override valve 140 becomes sufficient to move the valve element 141 thereof downwards, against the biasing action of the spring 146. (The pressure in the first pressure chamber 142 of this valve 140 is still substantially zero because the transmission is not yet in the third or the fourth speed stage). As soon as this happens, then the valve element 141 discommunicates the port 335 from the port 340 and instead communicates the port 340 to the drain port 153. This causes the supply of pressure to the second pressure chamber 133 of the anti creep control valve 130 to be abruptly cut off by the discommunication of the passage 137a from the passage 137b, and instead this second pressure chamber 133 is now communicated to the drain port 153. The pressure in this chamber 133 is now relatively quickly vented via the one-way valve 151 which bypasses the throttling element 150. Accordingly the pressure in the chamber 133 quickly drops to substantially zero and no upward force acts on the valve element 131, which accordingly shifts immediately and decisively downwards, thereby completely discommunicating the conduit 128 from the drain port 129. Accordingly, as shown by the vertical portion of the graph of FIG. 5, the pressure in the conduit 41a is no longer relieved at all through the conduit 128, and substantially immediately rises to line pressure P1, thus quickly and positively completely engaging the first clutch C1. This first transition of operational mode of the anti creep device Mc, from providing substantial anti creep action to providing substantially no anti creep action, is very quick, because of the provision of the one-way valve 151.

Now, if from this state the depression of the accelerator pedal of the vehicle is reduced, so that the second throttle pressure Pt2 comes to be less than the predetermined value $P_B$ again, then the valve element 141 of the override valve 140 is moved upwards by the biasing action of the spring 146 again, against the action of the throttle pressure Pt2 in the second pressure chamber 144. This again communicates the ports 335 and 340, thus restoring continuity of the conduit system 137 and disconnecting the second pressure chamber 133 of the anti creep control valve 130 from the drain port 153. However, because of the provision of the throttling element 150, and because the one-way valve 151 is now preventing flow of hydraulic fluid from the port 340 towards the chamber 133, this second operational mode transition of the anti creep device Mc from providing substantially no anti creep action back to the operational mode described earlier in which substantial anti creep action is being provided according to the sloping portion of the graph of FIG. 5, is substantially slower than was the above described first transition in the reverse direction, thus providing a certain time lag in the restoring of anti creep action and ensuring that no unpleasant shock is generated. This is done by the concept of providing the throttling element 150 and the one-way valve 151 in parallel on the path by which the second pressure chamber 133 is both filled and drained, said second pressure chamber 133 being one which alters in size according as to whether anti creeping action is provided or not.

Figure 5:
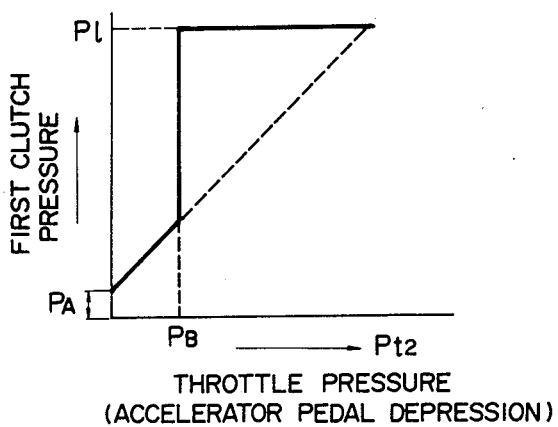
FIG. 5 is a graph, in which throttle pressure is shown along the horizontal axis and operating pressure for a first hydraulic clutch is shown along the vertical axis, explaining the characteristics of anti creep action provided by the anti creep means incorporated in the first preferred embodiment of the present invention.

Suppose now, rather than the accelerator pedal depression being reduced as was supposed above, that the vehicle speed progressively increases from the state described above in which anti creep action has followed the graph of FIG. 5, until the transmission shifts into the third speed stage, with the valve element 64b of the second/third shifting valve V2 moving leftwards. At this moment, line pressure P1 appears in the conduit 83 for actuating the third speed clutch C3 as explained previously, since the conduit 70 is communicated to said conduit 83, and this supply of line pressure is conducted via the conduit 147 to the first pressure chamber 142 of the override valve 140. This pressure positively and definitely pushes the valve element 141 downwards (if it was not already in the downwards position), and this definitely ensures that said valve element 141 discommunicates the port 335 from the port 340 and communicates the port 340 to the drain port 153, thus as before ensuring the cutting off of the supply of pressure to the second pressure chamber 133 of the anti creep control valve 130 and the quick draining of this pressure chamber 130. Thereby, as explained previously, the anti creep action of the anti creep device Mc is definitely now completely suspended, in this third speed stage; this is particularly according to the concept of the present invention. And this anti creep preventing action remains the same in the fourth speed stage, since again at this time the conduit 83 is provided with supply of line pressure P1.

ANTI CREEP OPERATION IN D3 RANGE

When the valve element 101 of the manual range setting valve Vm is shifted by two steps to the left from its position shown in FIG. 2 to the D3 range position, then the port 250 thereof is discommunicated from the conduit 106, and thus draining of the first pressure chamber 132 of the anti creep control valve 130 through said manual range setting valve Vm and through the second throttle valve Vt2 is no longer available; and nor is any other drain path from said chamber 132 available, because of the provision of the one-way valves 149 and 152. Thereby, anti creep action of the anti creep means Mc is definitely suspended, in all operational conditions of the transmission, for the following reason: since the pressure in the second pressure chamber 133 of the anti creep control valve 130 is transmitted, albeit slowly, via the throttling element 335 and the one-way valve 152 to the first pressure chamber 132, and cannot escape therefrom, thereby the pressure in the first pressure chamber 132 is always at least equal to that in the second pressure chamber 133; and since the pressure receiving area of the top end of the valve element 131 exposed to the pressure in the first pressure chamber 132 is larger than the pressure receiving area of the bottom end of said valve element 131 exposed to the pressure in the second pressure chamber 133, this, combined with the downward force exerted by the spring 134, ensures that the valve element 131 is always in its downward position and always discommunicates the conduit 128 from the drain port 129, thus not interfering with the operating pressure for the first clutch C1 in the conduit 41a and providing no anti creep action; this is particularly according to the concept of the present invention.

In principle, this difference in the pressure receiving areas of the upper and lower ends of the valve element 131 is not strictly necessary, but it is very helpful, because, in the case of the anti creep control valve 130 becoming dirty and sticking in an intermediate position in its bore, this pressure receiving area difference ensures that a large downward force is exerted on the valve element 131 as the line pressure P1 rises, and this positively and definitely causes the valve element 131 to be unstuck. Further, if in fact the valve element 131 should become stuck by any chance, then the operator of the vehicle is able to relieve this sticking by pressing the accelerator pedal of the vehicle sharply downwards, which will cause the second throttle pressure Pt2 to rise sharply to a maximum value near line pressure P1. Since this second throttle pressure Pt2 is introduced into the first pressure chamber 132 of the valve 130 via the conduit 106 and the one-way valve 149, the valve element 131 will thereby be very strongly pushed downwards, and its sticking will definitely be released.

Figure 3:
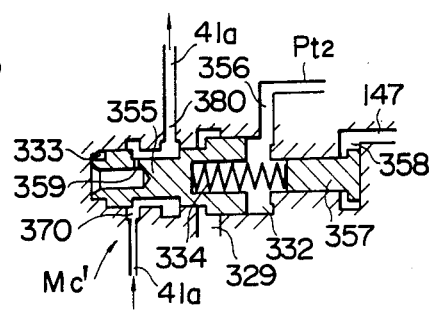
FIG. 3 is a partial view of a hydraulic fluid pressure circuit diagram of a control device for the second preferred embodiment of the present invention, showing only the anti creep device incorporated therein along with parts of its associated passages, and particularly showing a control valve thereof in axial sectional view.

In FIG. 3, an anti creep device Mc' incorporated in the control system for a second preferred embodiment of the transmission of the present invention is shown; the rest of this second preferred embodiment is the same as the corresponding parts of the first preferred embodiment shown in FIGS. 1 and 2. Conduits and other parts of this second embodiment corresponding or analogous to ones in the first embodiment are designated in FIG. 3 by the same reference numerals. In this second preferred embodiment, the anti creep device Mc' is interposed in the conduit 41a which comducts actuating hydraulic fluid pressure to the first clutch C1, rather than draining pressure from this conduit 41a by a branched conduit 128 as was the case in the first embodiment.

The device Mc' only comprises one valve, which has a valve element 355 which slides in a bore formed in a housing and a plunger 357 which slides in a bore formed at one end of said valve bore and coaxial therewith. The second throttle pressure Pt2 is supplied via a conduit 356 to a first pressure chamber 332 defined between the right end of the valve element 355 and the left end of the plunger 357, and the pressure in the conduit 83 (vide FIG. 2) is supplied to a third pressure chamber 358 defined at the right end of the plunger 357 via the conduit 147. A compression coil spring 334 is fitted between the plunger 357 and the valve element 355 and biases them apart. The upstream side (towards the manual range setting valve Vm) of the conduit 41a is connected to a port 370, and the downstream side thereof (towards the first clutch C1) is connected to a port 380, which is communicated with the port 370 when the valve element 355 is in its leftward position as shown in the figure and which is discommunicated from the port 370 when the valve element 355 is shifted rightwards. The pressure at the port 380, i.e. the actual pressure supplied to the first clutch C1 as an operating pressure, is supplied to a second pressure chamber 333 at the left end of the valve element 355 through a narrow conduit 359 formed in said valve element 355. By the way, in this second preferred embodiment, the throttling element 75 of FIG. 2 is not required.

Thus, assuming that the transmission is not in its third or fourth speed stage and that thus no substantial pressure is present in the conduit 83 and thus in the third pressure chamber 358, so that the plunger 357 is in its rightwards position as in the figure, then the valve element 355 is biased leftwards by the sum of the force generated by the throttle pressure Pt2 in the first pressure chamber 332 and the force of the spring 334, and is biased rightwards by the force generated by the operating pressure of the first clutch C1 in the second pressure chamber 333; and thus, by a balance process analogous to that in the first preferred embodiment described above, the value of said operating pressure of the first clutch C1 is regulated to be substantially equal to a basic pressure $P_A$ (according to the force of the spring 334) plus a pressure proportional to the second throttle pressure Pt2, and therefore an anti creep action is made available when the second throttle pressure Pt2 is minimum or near minimum, but as the accelerator pedal of the vehicle is depressed the operating pressure of the first clutch C1 is steadily increased. However, in this second preferred embodiment the beneficial operational characteristic shown by FIG. 5 with respect to the first preferred embodiment is not available. On the other hand, if the transmission comes to be its third or fourth speed stage and thus line pressure P1 comes to be present in the conduit 83 and thus in the third pressure chamber 358, then this biases the plunger 357 to its leftwards position, so as to force the valve element 355 leftwards to definitely completely communicate the port 370 with the port 380, so that in this operational state the conduit 41a is completely opened, and no anti creep action at all is made available. Thus, this effect of stopping anti creep action in the third or the fourth speed stage is provided in this second preferred embodiment, also, as in the first preferred embodiment. By the way, the drain conduit 329 is for venting excess pressure in the port 380 and aiding the establishment of the aforementioned balance.

In the shown first and second preferred embodiments, the output pressure of the second/third shifting valve V2 was used as a signal pressure for the anti creep device Mc, Mc', but the passage 136 could be directly opened and closed by this valve V2, as an alternative. Alternatively, the output pressure of the first/second shifting valve V1 or the output pressure of the third-/fourth shifting valve V3 could be used; and in the former case the anti creep action of the means Mc would be suspended when the transmission was shifted to any speed stage other than the first speed stage, while in the latter case the anti creep action of the means Mc would only be suspended when the transmission was shifted only to the fourth speed stage.

As described above, according to the present invention, since the action of the anti creep device is terminated in synchronization with the engagement of a higher speed stage of the transmission, the action of the anti creep device is terminated at a predetermined speed stage without requiring a special vehicle speed detector; and accordingly the transmission structure is kept simple and cheap. Furthermore, since this invention is also available to an automatic transmission in which no governor pressure is produced, as for example an electronically controlled transmission, it is possible to evolve a rational design with interchangability when manufacturing both hydraulic fluid pressure type transmissions and electronic type transmissions in a mixed production system.

Figure 4:
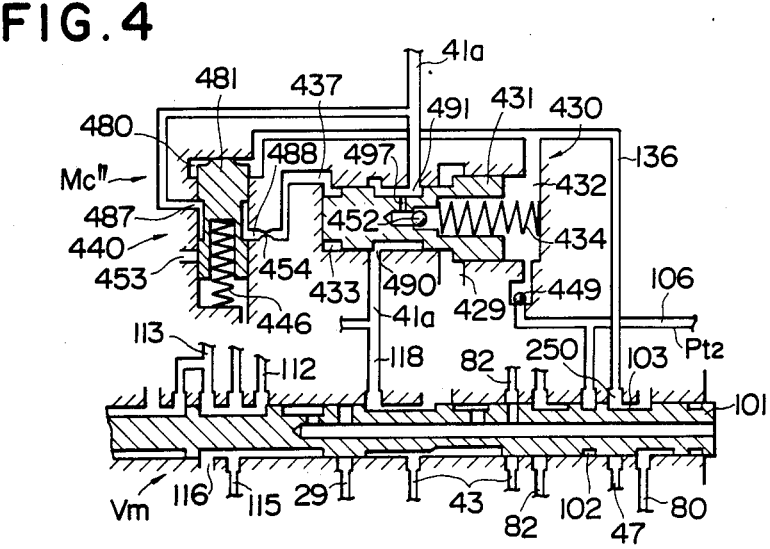
FIG.4 is a partial view of a hydraulic fluid pressure circuit diagram of a control device for the third preferred embodiment of the present invention, showing a manual range setting valve and an anti creep device incorporated therein along with parts of some of their associated passages, and particularly showing two control valves of said anti creep device in axial sectional view.

In FIG. 4, an anti creep device Mc" and part of the manual range setting valve Vm incorporated in the control system for a third preferred embodiment of the transmission of the present invention are shown; the rest of this third preferred embodiment is the same as the corresponding parts of the first preferred embodiment shown in FIGS. 1 and 2. Conduits and other parts of this third embodiment corresponding or analogous to ones in the first embodiment are again designated in FIG. 4 by the same reference numerals. In this third preferred embodiment, the anti creep device Mc" is again interposed in the conduit 41a which conducts actuating hydraulic fluid pressure to the first clutch C1 from the conduit 118, and comprises a first control valve 430, which has a valve element 431 which slides in a bore formed in a housing. The second throttle pressure Pt2 is supplied to a first pressure chamber 432 defined at the right end of the valve element 431 via a one-way valve 449, and is also supplied to a first pressure chamber 480 defined at the top end of a valve element 481 of a second control valve 440, which slides in a bore formed in a housing. A compression coil spring 434 fitted in the pressure chamber 432 biases the valve element 431 leftwards, and the control valve 430 has ports 490 and 491 which are respectively connected to the upstream and the downstream portions of the conduit 41a which supplies actuating fluid to the first clutch C1. The actuating pressure of the first clutch C1 is supplied to the first pressure chamber 432 via a passage 497 formed in the valve element 431 and a one-way valve 452, if in fact this clutch actuating pressure is greater than the second throttle pressure Pt2; and also this clutch actuating pressure is fed to a port 487 of the second control valve 440, from which it is transmitted, if and only if the valve element 481 is in its upwards position as shown in the figure, to a port 488 and thence via a throttling element 454 and a conduit 437 to a second pressure chamber 433 defined at the left end of the valve element 431 of the first control valve 430. On the other hand, when the valve element 481 of the second control valve 440 is in its downwards position, then this second pressure chamber 433 is communicated via said second control valve 440 to a drain port 453.

Thus, in this third preferred embodiment, the first control valve 430 is adapted to be opened by the second throttle pressure Pt2 and to be closed by the actuating pressure of the first speed clutch C1 and the spring force of the spring 434, while the second control valve 440 is adapted to be opened by the spring force of the spring 446 and to be closed by the second throttle pressure Pt2. According to this embodiment, when the manual range setting valve Vm is shifted to the D4 range position or by one step to the left from its position shown in FIG. 4, the second throttle pressure Pt2 is supplied to the first pressure chamber 432 of the first control valve 430 and the first pressure chamber 480 of the second control valve 440 via the conduit 106 and the port 250 of the manual range setting valve Vm and the conduit 136 as well as directly from the conduit 106 via the one-way valve 449. Therefore, in this D4 range, whenever the second throttle pressure Pt2 is absent in the conduit 106, the valve element 431 is shifted to the right and the anti creep action is produced.

On the other hand, when the manual range setting valve Vm is shifted to the D3 range or by two steps to the left from its position shown in FIG. 4, the conduit 136 is totally blocked by the valve element 101 of the manual range setting valve Vm and, therefore, the hydraulic fluid in the first pressure chamber 432 can not be vented at all although hydraulic fluid may be introduced thereinto by way of the one-way valve 449 when the second throttle pressure Pt2 is available. Furthermore, in this D3 range, the actuating hydraulic pressure for the first clutch C1 present in the conduit 41a is admitted into the first pressure chamber 432 by way of the one-way valve 452 provided in the valve element 431 of the first control valve 430. Since the pressure receiving area of the valve element 431 is greater at its right end than at its left end, the valve element 431 is positively biased leftwards, thereby forcing the valve element 431 to the leftmost position inhibiting the anti creep action at all times. Application of the second throttle pressure Pt2 on the right end of the valve element 431 further assures the anti creep inhibiting position of the valve element 431 even when there is some sticking of the valve element 431.

According to this embodiment, since the conduit 41a leading to the first clutch C1 is intercepted for anti creep action, instead of being drained of hydraulic fluid as was the case in the first embodiment, leakage loss of pressurized hydraulic fluid is minimized and accordingly more hydraulic fluid is available to other transmission parts.

The present invention is not to be considered as limited to the structure shown above; for example, in the case of the construction of the first preferred embodiment, as an alternative it would be possible for the second pressure chamber 133 of the anti creep control valve 130 to be selectively vented through the manual range setting valve Vm, when it is set to the D3 range position. Further, in the above shown exemplary first and third embodiments, the anti creep device Mc, Mc" was allowed to perform its anti creep action when the manual range control valve Vm was set to its D4 range position, and was prevented from performing its anti creep action when the manual range control valve Vm was set to its D3 range position; but the present invention is not limited to this particular functionality although such can be convenient, and it would be possible to have the creep enabled and disabled by a manually controlled valve which is entirely separate from the manual range control valve Vm. In either case, the provision of a manually activated creep control system means that the starting off feeling of the vehicle can be optimized, and the use of hydraulic fluid pressure for transmitting the signal from the manual control thereof assures reliability and simplicity of construction.

While the invention has been particularly shown and described with referene to preferred embodiments thereof, it will be understood by those skilled in the art that various changes in form and details may be made to the foregoing embodiments without departing from the spirit and scope of the invention.

What is claimed is:

1. An automatic transmission, comprising:
   (a) a fluid coupling;
   (b) a mechanical transmission mechanism coupled to said fluid coupling, comprising a plurality of power trains and a plurality of friction engagement mechanisms, various ones of said power trains being selectively engageable according to selective supply of actuating fluid pressure to selective ones of said friction engagement mechanisms to provide various speed stages including a lowest speed stage; and
   (c) a transmission control system comprising:
   (d) a means for producing a hydraulic pressure representative of engine output;
   (e) an anti creep valve for varying the actuating hydraulic fluid pressure for a one of said friction engagement mechansms which is engaged for providing said lowest speed stage, according to said hydraulic pressure representative of engine output, from a small value when engine output is low upward as engine output increases;
   (f) a means for inhibiting the action of said anti creep valve operatie to cause said actuating hydraulic fluid pressure for said one of said friction engagement mechanisms to be at its high value when said mechanical transmission mechanism is providing one of its speed stages higher than said lowest speed stage;
   (g) a shifting valve for switching between a pair of adjacent speed stages which produces a certain hydraulic fluid pressure when the higher one of said adjacent speed stages is engaged, said certain hydraulic fluid pressure being supplied to said inhibiting means; and
   (h) wherein said inhibiting means comprises a means for inhibiting the action of said anti creep valve on receiving said certain hydraulic fluid pressure.

2. An automatic transmission according to claim 1, wherein said shifting valve produces said certain hydraulic fluid pressure whenever a speed stage higher than the lower one of said adjacent speed stages is engaged.

3. The automatic transmission, comprising:
   (a) a fluid coupling;
   (b) a mechanical transmission mechanism coupled to said fluid coupling, comprising a plurality of power trains and a plurality of friction engagement mechanisms, various ones of said power trains being selectively engageable according to selective supply of actuating fluid pressure to selective ones of said friction engagement mechanisms to provide various speed stages including a lowest speed stage; and
   (c) a transmission control system comprising:
   (d) a means for producing hydraulic pressure representative of engine output;
   (e) an anti creep valve for varying the actuating hydraulic fluid pressure for a one of said friction engagement mechanisms which is engaged for providing said lowest speed stage, according to said hydraulic pressure representative of engine output, from a small value when engine output is low upward as engine output increases;

(f) a means for inhibiting the action of said anti creep valve operative to cause said actuating hydraulic fluid pressure for said one of said friction engagement mechanisms to be at its high value when said mechanical transmission mechanism is providing one of its speed stages higher than said lowest speed stage; and (g) wherein said anti creep valve and said inhibiting means have cavities responsive to engine output common to each other.

4. An automatic transmission, comprising:
(a) a fluid coupling;
(b) a mechanical transmission mechanism coupled to said fluid coupling, comprising a plurality of power trains and a plurality of friction engagement mechanisms, various ones of said power trains being selectively engagable according to selective supply of actuating fluid pressure to selective ones of said friction engagement mechanisms to provide various speed stages including a lowest speed stage; and (c) a transmission control system comprising:
(d) a means for producing a signal representative of engine output;
(e) an anti creep means for varying the actuating hydraulic fluid pressure for a one of said friction engagement mechanisms which is engaged for providing said lowest speed stage, according to said signal representative of engine output, from a low value when engine output is low upward as engine output increases;
(f) said anti creep means comprising:
(g) a first valve,
(h) a second valve,
(i) a cavity common to said first valve and said second valve, said cavity in direct communication with said producing means, and
(j) a means for inhibiting the action of said anti creep means, so as to cause said actuating hydraulic fluid pressure for said one of said friction engagement mechanisms to be at its high value.

* * * * *